United States Patent [19]

Maycock

[11] Patent Number: 4,562,910
[45] Date of Patent: Jan. 7, 1986

[54] DIAPHRAGM SPRING CLUTCH COVER ASSEMBLIES

[75] Inventor: Ian C. Maycock, Lillington, England

[73] Assignee: Automotive Products plc, Leamington Spa, England

[21] Appl. No.: 511,982

[22] Filed: Jul. 8, 1983

[30] Foreign Application Priority Data

Jul. 31, 1982 [GB] United Kingdom ............... 8222147

[51] Int. Cl.⁴ ............................................. F16D 13/71
[52] U.S. Cl. .............................. 192/70.27; 192/89 B
[58] Field of Search ................... 192/89 B, 70.27; 248/68.1, 74.1

[56] References Cited

U.S. PATENT DOCUMENTS 2,868,486  1/1959  Poupitch ........................... 248/68.1

FOREIGN PATENT DOCUMENTS 2132730  8/1977  Fed. Rep. of Germany .... 192/89 B
2025543  1/1980  United Kingdom .............. 192/89 B
2102899  2/1983  United Kingdom .............. 192/89 B Primary Examiner—Martin P. Schwadron
Assistant Examiner—Stephen M. Hepperle
Attorney, Agent, or Firm—Kemon & Estabrook

[57] ABSTRACT

A diaphragm spring clutch of the kind in which the diaphragm spring is retained by a plurality of tabs extending through windows in the spring and embracing a pair of wire fulcrum rings. Each tab is deformed radially outwards midway between the fulcrum rings to provide location for the spring and to allow for the outer radius of the windows to be made coincident with the fulcrum ring radii.

6 Claims, 20 Drawing Figures

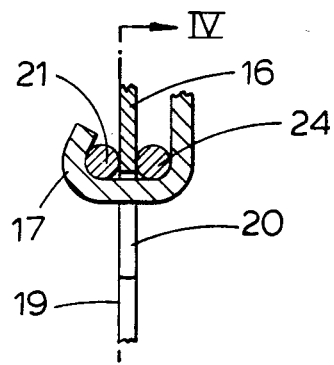
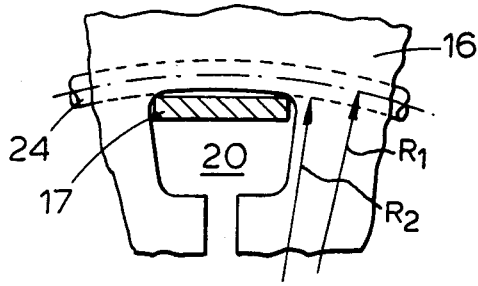
Fig.3  Fig.4
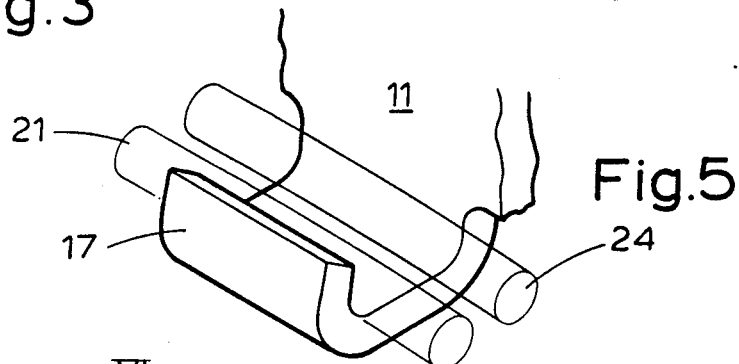
Fig.5
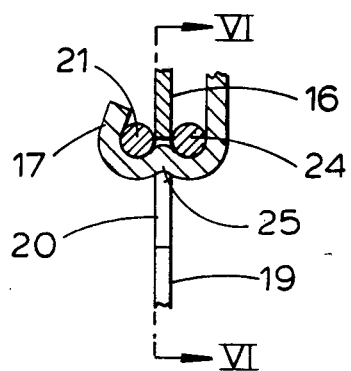
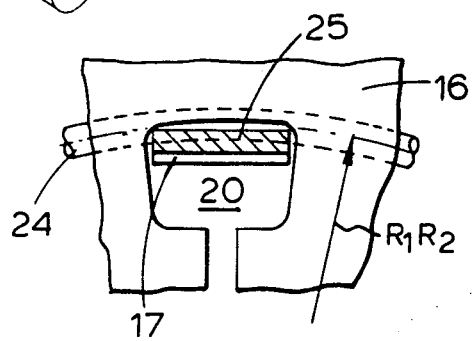
Fig.6  Fig.7
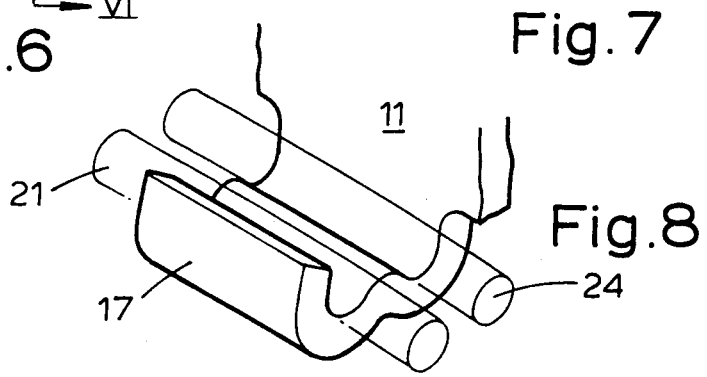
Fig.8

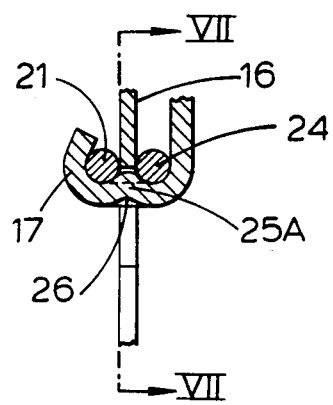
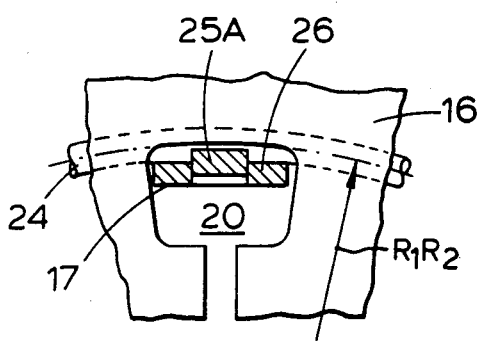
Fig.9  Fig.10
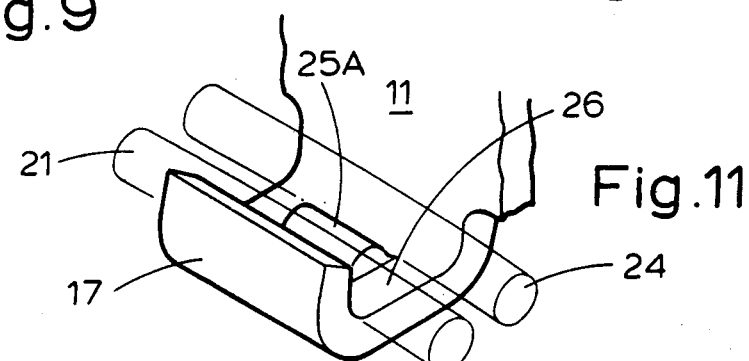
Fig.11
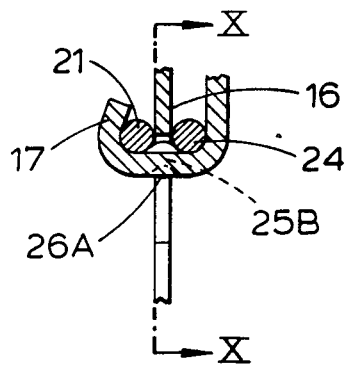
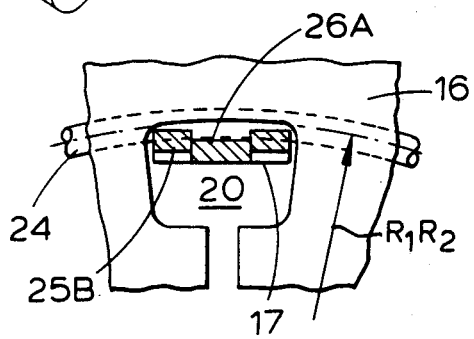
Fig.12  Fig.13
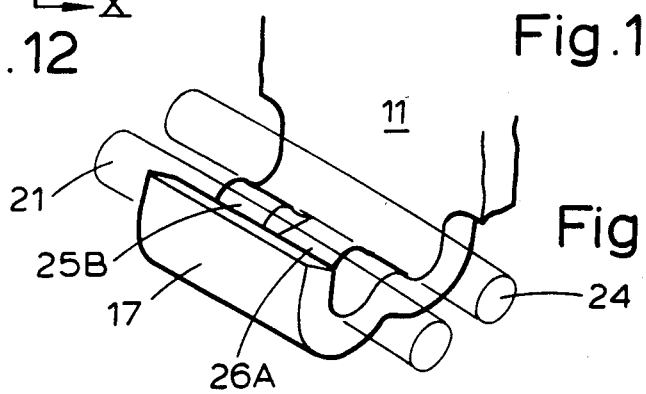
Fig.14

DIAPHRAGM SPRING CLUTCH COVER ASSEMBLIES

The invention relates to diaphragm spring clutch cover assemblies of the kind which comprise a cover, a diaphragm spring having a plurality of radially inwardly directed fingers and which is carried by the cover adjacent to the radially outer ends of the fingers, and a plurality of tabs which extend through windows formed at the radially outer ends of slots which separate adjacent fingers of the diaphragm spring, the tabs embracing a fulcrum ring which is located on the opposite side of the diaphragm spring to the cover and which axially supports the diaphragm spring.

In known clutch assemblies of the kind described above, as shown in GB. No. 1 347 485 and EP No. 0 049 058A the tabs extend axially through the windows and are substantially flat in this region. The side edges of the tab extend to almost the width of the window so as to contact the outer corners of the window edge. This gives excellent radial and circumferential location for the diaphragm spring but has the consequence that the radially outer edge of each window is on a radius which is substantially less than the fulcrum radius of the fulcrum ring. This has the disadvantage that the fulcrum ratio of the diaphragm spring is lower than can be obtained by other methods of supporting the diaphragm spring. The fulcrum ratio of a diaphragm spring is the ratio of the difference between the fulcrum radii to the effective radial width when considered as a Belleville spring. In clutches a high fulcrum ratio is generally desirable since this provides a load/deflection characteristic in which a given load is maintained or exceeded over a greater range of spring deflection than is provided by a diaphragm spring mounted to give a lower fulcrum ratio.

It is an object of the invention to provide a diaphragm spring clutch cover assembly of the kind described having a relatively high fulcrum ratio and yet retaining excellent diaphragm spring location.

According to the invention there is provided a diaphragm spring clutch cover assembly of the kind described characterised in that each tab has a deformed portion which protrudes radially outwardly in the region of the associated window, the deformed portion providing radial location for the diaphragm spring.

The deformed portion may extend across the full width of the tab or only across part of the width of the tab and may be a half sheared portion of the tab with either two deformed portions flanking a straight portion or two straight portions flanking a deformed portion.

Alternatively the deformed portion may be formed as a dimple depression on one side of the tab and corresponding dome on the other side.

The invention will now be described by way of example and with reference to the accompanying drawings, of which:

FIG. 3 is a scrap-section on the line III—III of FIG. 1;

FIG. 4 is a scrap-section on the line IV—IV of FIG. 3;

FIG. 5 is a pictorial view of the tab shown in the scrap-sections of FIGS. 3 and 4;

FIG. 6 is a scrap-section similar to FIG. 3 showing the clutch cover assembly of FIGS. 1-5 modified according to the invention;

FIG. 7 is a scrap-section on the line VI—VI of FIG. 6;

FIG. 8 is a pictorial view of the tab shown in the scrap-sections of FIGS. 6 and 7;

FIG. 9 is a scrap-section similar to FIG. 3 showing another modification according to the invention;

FIG. 10 is a scrap-section on the line VII of FIG. 9;

FIG. 11 is a pictorial view of the tab shown in the scrap-sections of FIGS. 9 and 10;

FIG. 12 is a scrap-section similar to FIG. 3 showing a further modification according to the invention;

FIG. 13 is a scrap-section on the line X—X of FIG. 12;

FIG. 14 is a pictorial view of the tab shown in the scrap-sections of FIGS. 12 and 13;

Figure 1:
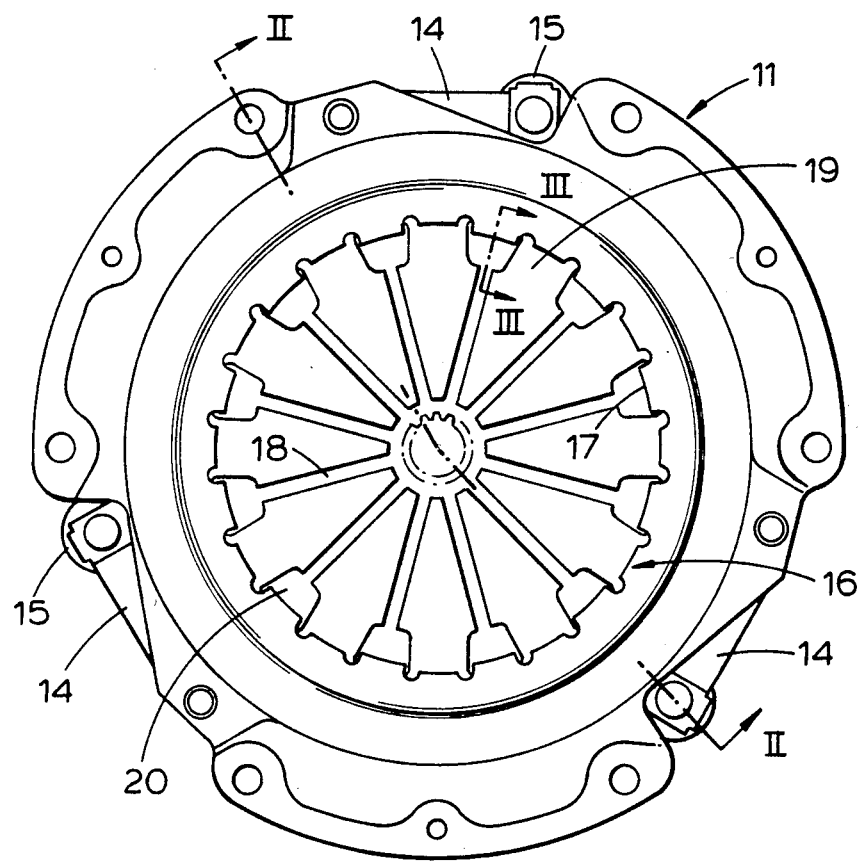
FIG. 1 is an elevation of a known diaphragm spring clutch cover assembly of the kind described.
Figure 2:
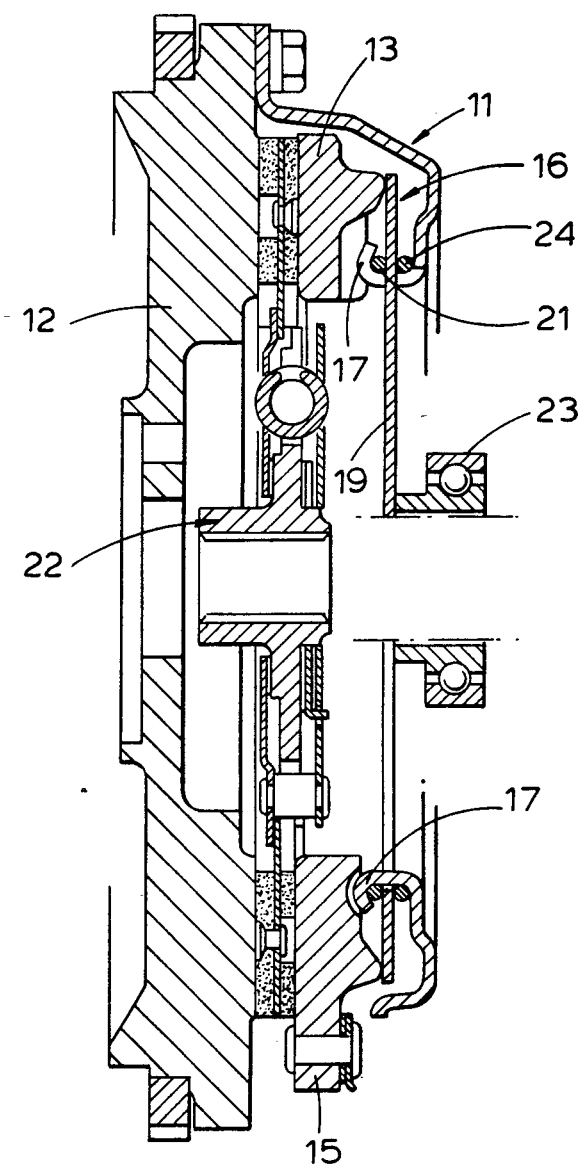
FIG. 2 is a cross-section on the line II—II of FIG. 1, also showing an associated flywheel and clutch driven plate.

Referring to FIGS. 1 to 5 the known diaphragm spring clutch cover assembly comprises a pressed steel cover 11 adapted to be bolted to a driving member in the form of an engine flywheel 12. A pressure plate 13 is driven for rotation with the cover 11 by sets of tangential straps 14 which are riveted to lugs 15 on the pressure plate 13 and to the cover 11.

A diaphragm spring 16 is supported axially by fulcrum support means in the form of a fulcrum ring 24 on the cover side of the diaphragm spring 16, and by another fulcrum ring 21 on the opposite side of the diaphragm spring to the cover. The diaphragm spring has a plurality of radially inwardly directed fingers 19, adjacent fingers 19 being separated by slots 18 which terminate in windows 20 at their radially outer ends.

A circular array of tabs 17 which, as shown, are integral with the cover 11 extend through the windows 20 to embrace the fulcrum ring 21. GB No. 1 514 297 describes a method of and apparatus for assembling the sub-assembly comprising the cover 11, diaphragm spring 16 and fulcrum rings 21 and 24.

In use a driven plate 22 is clamped between the engine flywheel 12 and the pressure plate 13. To disengage the drive through the driven plate 22 a release bearing 23 moves the radially inner ends of the fingers 19 so that the diaphragm spring pivots about the fulcrum rings 21 and 24. The pressure plate 13 then moves away from the flywheel 12 under the action of an axial spring load provided by the straps 14.

In FIGS. 3, 4 and 5 it can be seen that the tab 17 extends axially through the window 20 and is substantially flat in this region. The side edges of the tab 17 extends to almost the width of the window 20 so as to contact the outer corners of the window edge and provide radial and circumferential location. The problem with this arrangement is that the tab locates the fulcrum rings 21 and 24 at a fulcrum radius $R_f$ which is substantially greater than the radius $R_2$ defining the radially outer edge of the window 20. Hence the full radial width of the Belleville (or annular) portion of the diaphragm spring cannot be utilised and only a relatively low fulcrum ratio is attained.

FIGS. 6, 7 and 8 show how the clutch assembly shown in FIGS. 1 to 5 is modified according to the invention so that the fulcrum radius $R_f$ of the fulcrum rings 21 and 24 substantially coincides with the radius $R_2$ defining the radially outer edge of the window 20. The tab 17 has a radially outwardly deformed portion 25 over its full width in the region where is passes through the window 20. The deformed portion 25 locates the diaphragm spring at the radially outer corners of the windows to provide both radial and circumferential location.

In the modification shown in FIGS. 9, 10 and 11 the tab 17 has a radially outwardly deformed portion 25A over only part of its width being half-sheared in the region where it passes through the window 20 flanked by two straight portions 26. This maintains the tensile stiffness of the tab and minimises any need to modify existing assembly methods and apparatus.

FIGS. 12, 13 and 14 show how the modification of FIGS. 7 and 8 can be varied so that the straight portion 26A is flanked by two radially deformed portions 25B. This has the further advantage that the diaphragm spring 16 is located at the corners of the window 20.

Figure 15:
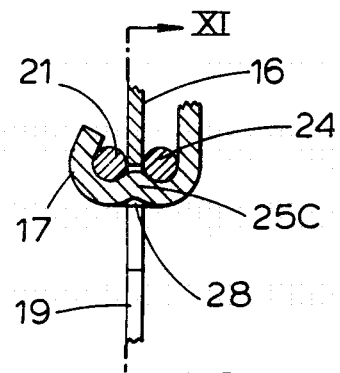
FIG. 15 is a scrap-section similar to FIG. 3 showing a further modification according to the invention.
Figure 16:
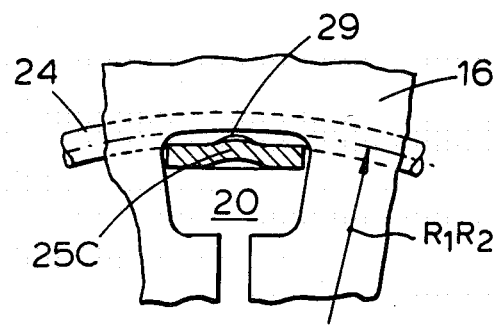
FIG. 16 is a scrap-section on the line XI—XI of FIG. 15.
Figure 17:
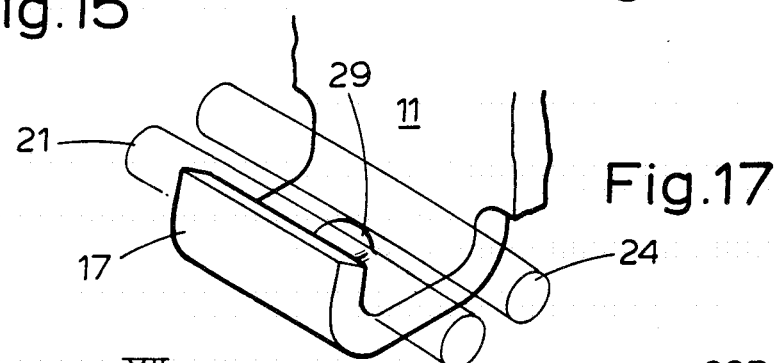
FIG. 17 is a pictorial view of the tab shown in the scrap-sections of FIGS. 15 and 16.

FIGS. 15, 16 and 17 show how in a further modification the radially outwardly deformed portion 25C of the tab 17 is formed as a dimple depression 28 on the radially inner face and a raised dome 29 on the radially outer face of said portion 25C in the region where it passes through the window 20. This avoids the ragged edges usually associated with half-sheared portions.

Figure 18:
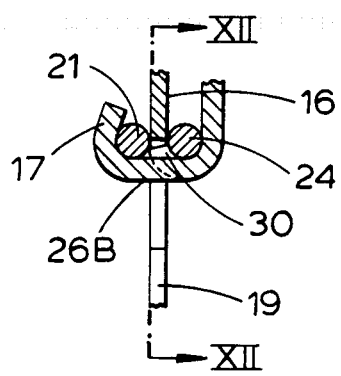
FIG. 18 is a scrap-section similar to FIG. 3 showing a further modification according to the invention.
Figure 19:
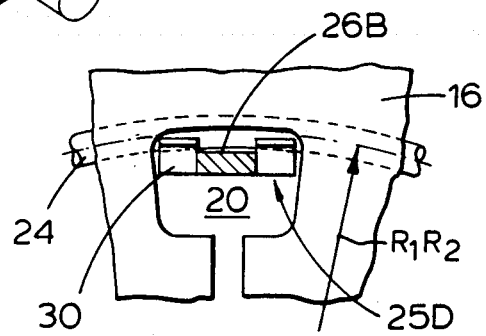
FIG. 19 is a scrap-section on the line XII—XII of FIG. 18.
Figure 20:
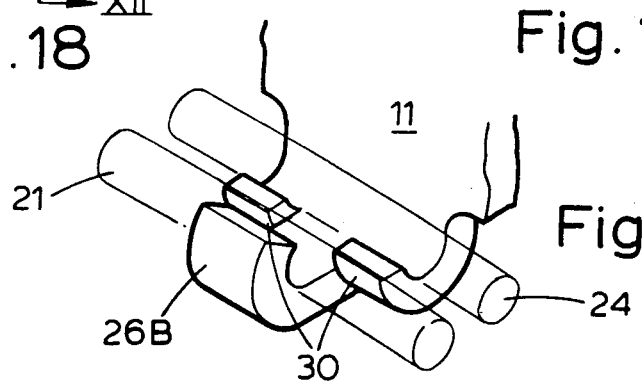
FIG. 20 is a pictorial view of the tab shown in the scrap-sections of FIGS. 18 and 19.

FIGS. 18, 19 and 20 show how in a further modification the radially outwardly deformed portion 25D of the tab 17 is formed as two truncated portions 30 flanking straight portion 26B.

I claim:

1. A diaphragm spring clutch cover assembly comprising:
   a cover;
   a pressure plate mounted for rotation with the cover;
   a diaphragm spring acting between the cover and the pressure plate and having a plurality of inwardly directed fingers separated by slots, the radially outer ends of the slots terminating as windows in the diaphragm spring;
   a fulcrum support means on the cover side of the diaphragm spring and a fulcrum ring on the opposite side of the diaphragm spring to the cover to provide axial support for the diaphragm spring;
   a circular array of tabs on the cover, the tabs extending through the windows in the diaphragm spring to embrace the fulcrum ring, each tab having a deformed portion which protrudes radially outwardly intermediate the fulcrum support means and the fulcrum ring to radially locate said diaphragm spring.

2. A diaphragm spring clutch cover assembly as claimed in claim 1, wherein the deformed portion of the tab extends across the full width of the tab.

3. A diaphragm spring clutch cover assembly as claimed in claim 1, wherein the deformed portion is a half-sheared portion of the tab.

4. A diaphragm spring clutch cover assembly as claimed in claim 3, wherein the deformed portion is flanked by two straight portions.

5. A diaphragm spring clutch cover assembly as claimed in claim 3, wherein two deformed portions flank a straight portion.

6. A diaphragm spring clutch cover assembly as claimed in claim 1, wherein the deformed portion is in the form of a depression on the radially inner face and a raised dome on the radially outer face of the tabs.

* * * * *